Patented June 26, 1928.

1,674,642

UNITED STATES PATENT OFFICE.

HENRY HARRIS, OF LONDON, ENGLAND.

SEPARATION OF INGREDIENTS FROM AN ALKALINE MIXTURE CONTAINING OXYSALT OF ARSENIC AND/OR OXYSALT OF TIN.

No Drawing. Application filed November 22, 1923, Serial No. 676,261, and in Great Britain December 4, 1922.

My invention relates to separation of ingredients from an alkaline mixture containing oxysalt of arsenic and/or oxysalt of tin.

The invention is especially useful for the treatment of a mixture containing caustic soda in large proportion, produced by the refining of lead with, or with aid of, caustic soda and containing arsenic or tin, or both, and frequently antimony, the object being to separate and recover one or more of these constituents in a manner which leaves the caustic soda in a condition for recovery for re-use in the refining operation. But I do not wish to confine my invention to the treatment of a mixture containing all of these impurities, nor to a mixture resulting from the refining of molten lead, as the invention in certain aspects may be useful in recovering one or more of said ingredients from a caustic soda mixture resulting from the refining of other metals, or from the treatment of metal ores, such for example as tin ore containing one or more of said ingredients.

The invention may be utilized very efficiently in the recovery of all of the above mentioned ingredients from the alkali reagent mixture resulting from refining lead according to my known process wherein a reagent is used consisting of caustic soda and sodium chlorid with a suitable oxidizer, such for example as sodium nitrate or sodium chlorate (as set forth in my co-pending application Serial No. 724,899, filed July 8, 1924, as a continuation of my application Serial No. 568,632, filed June 15, 1922).

According to the said last mentioned process the molten lead at a temperature less than about 500° C. and containing for example arsenic, tin and antimony, is circulated in sprayed form through the said molten reagent mixture until these impurities have been substantially removed from the lead and are found in the molten reagent mix. The resulting molten mix or melt will then contain the spent caustic soda and sodium chlorid and the alkali oxysalts of antimony, tin and arsenic, with some metallic lead in mechanically mixed fine granular form.

One of the objects of my invention is to enable the separation and recovery from this melt of some or all of such ingredients as tin, arsenic, antimony and caustic soda which may be present.

A feature of the present invention consists in the removal of the arsenic as a sodium oxysalt from a hot solution of the mixture by cooling and crystallization as I have found that arsenic is but sparingly soluble in cold water containing much caustic soda; and that by having the caustic soda solution at a proper degree of concentration, substantially all of the arsenic can be crystallized and removed from the mixture upon cooling, in a single operation. Such separation is to be distinguished from crystallization from aqueous solutions such as proposed for instance in recovering arsenic from roasted ore by heating with sufficient caustic soda to leave a slight excess, leaching to obtain the sodium arsenate in aqueous solution and concentrating by evaporating the hot liquor to saturation point whereby on cooling sodium arsenate crystals separate out due to their insolubility in a cold saturated aqueous solution of sodium arsenate, and if desired again evaporating the mother liquor to obtain further crops of crystals.

A further feature of the invention consists in separating the soluble oxysalt of tin, if present in the mixture, by the aid of arsenic with which I have found that it can be thrown out of solution as sodium oxysalt of tin together with the sodium oxysalt of arsenic in the form of a bulky crystalline mass. In the absence of oxysalt of arsenic, oxysalt of tin is thrown out of weaker solutions very imperfectly, i. e., solutions of such concentrations as are best suited for the crystallization of arsenic, and for complete separation of the tin from such weaker solutions it appears essential that there shall be present in the solution at least three parts by weight of arsenic (As) to 1 part by weight of tin (Sn). Hence it may sometimes be advisable to provide additional oxysalt of arsenic in the solution in order that all the oxysalt of tin may be separated.

The invention consists in the novel process and features or steps of the process, which I shall hereinafter describe, by way of example, according to certain specific preferred methods of practicing the same, and the invention will then be more particularly pointed out in the appended claims.

Generally stated, and with respect to the complete and preferred manner of carrying out the process when dealing with a more or less solid mass derived, for example, as a by-product of the refining of lead, the invention comprises first dissolving the mass or melt in hot water and separating out the undissolved ingredients such as the small lead particles and antimony and/or other insoluble oxysalts by gravity or other suitable means, secondly separating out from the remaining solution the soluble oxysalts of tin and arsenic by having or bringing the remaining solution to a suitable concentration such that upon cooling, these oxysalts will be rendered insoluble and crystallize; thirdly (if sodium chlorid has been used) after removing said crystals, concentrating the remaining liquor or effluent sufficiently to salt out the sodium chlorid (if it is to be separated from the caustic alkali) and then recovering the caustic alkali from the remaining liquor; fourthly, separating the tin (if present) from said crystals by dissolving these crystals as in water, precipitating the tin from the resulting solution by the use of a suitable compound of an alkali earth metal—a suitable calcareous material which in that solution will precipitate the tin without precipitating the arsenic, such for example as the use of carbonate of calcium—and removing the precipitated tin compound from the liquor; fifthly, after removing any carbonic acid in the liquor precipitating the arsenic from said liquor, as for example by treating the liquor with caustic lime; and finally recovering the remaining caustic from the last liquor as by evaporation (with or without previous treatment for purifying the liquor, depending upon the previous procedure).

The following example illustrates in detail the preferred manner of carrying out a complete process in accordance with the invention as applied to cases where arsenic, tin in small percentage, and antimony are present in a mixture or melt which also contains caustic soda and sodium chlorid, possibly with minor impurities.

(1) The molten mixture is dissolved in a suitable quantity of hot water (determined by considerations stated hereinafter) preferably free of carbonate of lime. The contained oxysalt of antimony for the most part remains insoluble in the mixture, while the oxysalts of tin if not present in too great a percentage, and arsenic as well as the caustic soda and sodium chlorid remain in solution. The hot mixture is mildly agitated so that the insoluble antimony and any insoluble tin that may be present remains in suspension whilst the granules of lead are deposited. While thus in mild agitation the heated solution with the antimony in suspension and also some tin if the percentage of tin is large, is decanted from the dissolving vat into another tank leaving the lead granules behind.

(2) The decanted hot aqueous mixture is then allowed to stand until the insoluble oxysalt or oxysalts settle, the mixture not being allowed to cool to a point where crystallization of the soluble oxysalts of arsenic and tin will begin (this may occur at about 70° C. when the molten liquor of the mixture is at about the strength of concentration hereinafter stated). The solution is then separated from the antimony by decantation or filtration. As pointed out in my said co-pending application, if sufficient sodium chlorid is present in the aqueous mixture to give a substantially saturated solution of sodium chlorid, substantially all of the antimony will be rendered insoluble and will separate out in better physical form.

(3) The decanted solution at the proper degree of concentration is then allowed to cool to about 30 to 25° C. to crystallize the oxysalts of arsenic and tin. As already stated, the oxysalt of arsenic will be rendered insoluble and crystallize at proper concentration even when no tin is present in the solution, but tin if present in weak alkali solutions such as those best suited for crystallizing arsenic, will only crystallize when some arsenic is present, and substantially all of the tin will only crystallize at such weaker concentrations, when the correct proportions of tin and arsenic are present in the solution, that is, at least three parts by weight of arsenic to one of tin. Therefore, I endeavor in refining the lead or alloy for example so to mix the various grades of lead or alloys at my disposal that the lead or alloys to be treated and hence the solutions derived from their treatment will contain arsenic in the proportion of at least three times the weight of the tin present. But if it is not convenient or possible so to grade the metal, I may set aside caustic solutions from previous operations, one rich in arsenic and one rich in tin, preferably derived from corresponding metals, with a view of adding one or the other to the solution to be treated so as to get the desired proportion. Or I may add the arsenic in any suitable form, such as the arsenic in solution derived from a subsequent step of this process as hereinafter described. Also, to effect the crystallization, the solution mother liquor must be at a degree of concentration at which the crystals of substantially the whole of the oxysalts will separate in a form suitable for removal from the liquid and this correct concentration may be judged by cooling and removing the crystals from a test portion of the liquid and ascertaining the specific gravity of the mother liquor. For example, where the original reagent used for refining the lead contained caustic soda and sodium chloride roughly in the proportion of 3 to 1, then sufficient water may if necessary be added to the solution, after separating the antimony and any other insoluble oxysalt and lead, to bring the specific gravity of the said mother liquor (i. e., the liquor after the oxysalts of arsenic and tin have been removed) to about 1.35. If no sodium chloride is present the mother liquor is equally brought to a specific gravity of about 1.35 in the case of small percentages of tin. If, however, the necessary full amount of water is to be added when the original mixture is dissolved, then the water must be in such quantity that when the lead granules, the insoluble oxysalts, and the crystallized soluble oxysalts of arsenic and tin have been removed, the specific gravity of the said mother liquor will be as above given.

By the above procedure the majority of the oxysalts of arsenic and tin will be crystallized, and with the crystals there may possibly be entangled a little antimony oxysalt. These crystals are then separated from the mixture such as by filtering the mixture or by passing it through a centrifugal machine. (Obviously, if desired, instead of first separating out the insoluble oxysalts as in (2), and then crystallizing the soluble oxysalts by cooling the caustic solution, the insoluble oxysalts may remain in the solution and be taken out with the crystallized soluble oxysalts upon cooling.)

(4) The liquor thus separated from these solids contains most of the free caustic soda and sodium chloride, excepting that which remains to be washed from the antimony precipitates, and this liquor is concentrated to a specific gravity of about 1.6 at which strength the sodium chloride salts out and may be separated if desired, leaving a solution of caustic soda of sufficient purity to be again used for lead refining.

(5) The crystals of the oxysalts of arsenic and tin obtained from (3) as above, are preferably purified to free them from small quantities of antimony precipitate and free caustic solution. This is accomplished by re-dissolving these crystals in hot water, allowing the hot solution to stand to settle the antimony and by cooling and centrifuging or filtering off the re-crystallized oxysalts. The precipitate and mother liquor are retained and treated.

(6) The crystals are then re-dissolved in water and the solution is treated with a suitable proportion of a suitable calcareous material which will precipitate the tin without the arsenic, such as carbonate of calcium, preferably in the form of crushed chalk ($CaCO_3$), in which case the solution may be either hot or cold. For example, about 150 grams of commercial chalk containing 52 per cent of CaO may be required to precipitate each 100 grams of tin present. The precipitate contains substantially all of the tin and but very little arsenic. This precipitate is separated from the solution which contains practically the whole of the arsenic.

(7) The solution from (6) containing arsenic—where carbonate of calcium has been used, in a carbonated alkali solution of proper strength—is then treated to separate the arsenic. This may be done by first boiling the solution with caustic lime for the conversion of sodium carbonate into caustic soda. The solution is then treated with a further quantity of caustic lime whereupon the arsenic is precipitated as arsenate of lime and the alkali with which the arsenic was associated freed for subsequent use in refining lead.

It was pointed out in step 3 of the foregoing example, that the decanted solution containing the caustic alkali, the sodium chloride and the oxysalts of arsenic and tin should be brought to the proper degree of concentration so that upon cooling to about 30 to 25° C. these oxysalts will substantially completely crystallize. If the solution is not already at the proper degree of concentration, the decanted solution or mixture is either diluted or concentrated, as the case may be, until its concentration is such that by cooling it from a temperature considerably above about 30° C. to a temperature around about 25° C., the substantially complete separation of the oxysalts occurs. However, the degree of concentration at which the most complete separation occurs may vary considerably with the treatment of different mixtures. But the best concentration is that concentration of the mother liquor at which the crystals are most completely and easily removed from the liquid (i. e., the concentration at which the oxysalts of the particular mixture of arsenic and tin are most insoluble in the cold) by cooling and centrifuging or filtering, and in each case this may be ascertained empirically on a test portion. When the best concentration has been found, the specific gravity of the liquid from which the crystals have been removed may be taken as the criterion of the correct concentration of the mother liquor in further work on the particular batch of material, but this property will, of course, vary with the composition of the mixture, for instance, whether it contains salts such as sodium chloride.

The following are other examples of how the invention may be practiced.

(6ª) The foregoing steps of the first example up to 6, are followed, and then commencing with the crystals of the oxysalts of tin and arsenic as in 6, these crystals are treated with a suitable limited proportion of lime less than an excess, such as by being dissolved in water and adding to the cold solution 472 grams of CaO in the form of milk of lime per 1000 grams of tin present. A precipitate containing the tin and a little arsenic is obtained. The bulk of the arsenic remains dissolved, and the solution containing the arsenic is separated from the tin precipitate.

(7ª) This solution (from 6ª) is then treated to separate arsenic. In this case, this may be accomplished by boiling the solution with an excess of lime to precipitate the arsenic as arsenate of lime, or by evaporating the solution until the strength of the alkali is such that sodium arsenate can crystallize out. In the first case the remaining solution contains the whole of the caustic alkali which was originally in combination with the oxysalts of tin and arsenic, and in the second case it contains the caustic alkali which was formerly in combination with the tin. After separating the solution from the arsenate it is treated for the recovery of caustic alkali for further use in refining lead.

(6ᵇ) Alternatively, following, the first example up to 6, and commencing with the crystals of the oxysalts of tin and arsenic, as in (6), these are treated with alkali bicarbonate or with carbon dioxide, such as by being dissolved in water, and boiling the solution with sodium bicarbonate or passing carbon dioxide through the hot solution. This precipitates tin in the form of stannic oxide or a stannic acid, leaving alkali oxysalt of arsenic in solution. The whole of the alkali which was originally combined with the tin remains in the solution as carbonate.

(7ᵇ) The solution containing arsenic in a carbonated alkali solution is then treated to separate the arsenic. This may be done as in (7).

(6ᶜ) Alternatively, following the first example up to 6, and commencing with the crystals of the oxysalts of arsenic and tin, as in (6), these are treated with excess of lime, such as by being dissolved in water, which may be hot or cold, and boiled with excess of milk of lime. Tin and arsenic are precipitated and may then be separated in any known manner. The remaining solution contains substantially the whole of the alkali which was originally in combination with the tin and arsenic and the solution may be treated for the recovery of caustic alkali for further use in refining lead.

It will be understood that if desired, instead of treating the solution after the separation of the tin therefrom as hereinbefore described, the alkali solution after precipitation of the tin may be treated for the separation of other commercial compounds of arsenic.

Where I use the word "metal" or "lead" in the claims, I do so for brevity and convenience, and do not wish to be limited thereby to treating mats or mixtures derived from "lead" or other "metal" as distinguished, respectively, from treating mixtures derived from lead or other metallic ores.

While I have described my invention in detail in connection with certain particular ways of practicing the same for the purpose of showing the full advantages thereof, it will be understood by those skilled in the art, after understanding my invention, that various modifications and substitutions may be made in the carrying out of the invention, depending upon the particular ingredients and proportions thereof, present in the mix and to be recovered, as well as upon the character of the reagent used in the treatment of the metal from which the ingredients were derived, and also that certain steps of the invention may be practiced in certain instances without the whole, and I therefore do not wish to be limited to the particular procedure as described, but aim in the appended claims to cover all such features and modifications as come within the spirit and scope of the invention.

Having thus described my invention, what I claim as new and desire to secure by Letters Patent, is:

1. Method of recovering ingredients from an alkali aqueous mixture containing caustic soda in strong hot solution and soluble oxysalts, which comprises establishing such a degree of concentration of the caustic soda solution of the mixture as will render the soluble oxysalts substantially insoluble on cooling the mixture, such that upon cooling substantially all of the oxysalts in the mixture will separate out in one operation, cooling the mixture to separate the oxysalts, and then separating said oxysalts from the caustic soda solution.

2. Method of recovering ingredients from an alkali aqueous mixture containing caustic soda in strong hot solution and oxysalt of arsenic in solution, which comprises establishing such a degree of concentration of the caustic soda solution of the mixture as will render the oxysalt of arsenic in the mixture substantially insoluble on cooling the mixture, such that upon cooling substantially all of the oxysalt of arsenic will separate out in one operation, cooling the mixture to separate out said oxysalt, and separating said oxysalt from the caustic soda solution.

3. Method of recovering ingredients from an alkali aqueous mixture containing caustic soda in strong hot solution, and oxysalt of arsenic in solution, which for the separation of arsenic comprises establishing such a degree of concentration of the mixture that when a sample of the hot aqueous mixture is cooled to about 25° C. and the contained solid ingredients separated therefrom, the resulting caustic soda solution at about said temperature will have a specific gravity of about 1.35.

4. Method of recovering ingredients from an alkali aqueous mixture containing caustic soda in strong hot solution and oxysalts of arsenic and tin in solution, which comprises establishing such a degree of concentration of the caustic soda solution of the mixture as will render said oxysalts of arsenic and tin substantially insoluble on cooling the mixture, such that upon cooling substantially all of the oxysalts of arsenic and tin in the mixture will separate out in one operation, cooling the mixture to separate said oxysalts and separating said oxysalts from the caustic soda solution.

5. Method of recovering ingredients from a molten or solid mass containing much caustic soda and oxysalts of arsenic and tin, which comprises producing from said mass a hot aqueous mixture containing caustic soda in strong hot solution and oxysalts of arsenic and tin in solution, establishing such a degree of concentration of the caustic soda solution of the mixture as will render said oxysalts of arsenic and tin substantially insoluble on cooling the mixture, such that upon cooling substantially all of the oxysalts of arsenic and tin in the mixture will separate out in one operation, cooling the mixture to separate said oxysalts and separating said oxysalts from the caustic soda solution.

6. Method of recovering ingredients from a molten or solid mass containing much caustic soda and the oxysalts of arsenic and tin, which comprises dissolving the mass to form a hot alkali aqueous mixture, keeping the mixture mildly agitated to allow coarser insoluble ingredients such as small lead particles to settle out while retaining in suspension lighter ingredients if any insoluble therein, such as an insoluble oxysalt, separating out such insoluble oxysalt if any and removing the insoluble oxysalt from the mixture, establishing such a degree of concentration of the caustic soda solution of the remaining mixture as will render the soluble oxysalts of the mixture substantially insoluble on cooling the mixture, such that upon cooling substantially all of the oxysalts in the mixture will separate out in one operation, cooling the mixture to separate the oxysalts and separating said oxysalts from the caustic soda solution, dissolving these oxysalt crystals and treating this solution with a suitable compound which in the solution will precipitate tin without precipitating an appreciable amount of the oxysalt of arsenic, separating the precipitate and treating the remaining solution to remove the arsenic therefrom.

7. Method of recovering ingredients from an alkali aqueous mixture containing caustic soda in strong hot solution and the oxysalts of arsenic and tin, which comprises separating from the mixture the insoluble lead particles, establishing such a degree of concentration of the caustic soda solution of the mixture as will render the soluble oxysalts of the mixture substantially insoluble on cooling the mixture, such that upon cooling substantially all of the oxysalts in the mixture will separate out in one operation, cooling the mixture to separate the oxysalts, separating said oxysalts from the caustic soda solution, dissolving the recovered oxysalt crystals and subjecting the solution to reactions which will precipitate the arsenic and tin of the oxysalts and yield caustic soda.

8. In a method of recovering ingredients from an alkali aqueous mixture containing caustic soda in strong hot solution, an excess of sodium chlorid and the oxysalts of antimony and that of arsenic and tin, the steps which comprise separating from the mixture the insoluble lead particles while retaining in suspension lighter insoluble oxysalts of antimony, establishing such a degree of concentration of the caustic soda solution of this mixture as will render the soluble oxysalts substantially insoluble on cooling the mixture such that upon cooling substantially all of the oxysalts in the mixture will separate out in one operation, cooling the mixture to separate the oxysalts and separating said oxysalts from the caustic soda solution.

9. Method of recovering ingredients from an alkali aqueous mixture containng caustic soda in strong hot solution and also ingredients including arsenic and tin in solution and some ingredients undissolved, which comprises separating out the insoluble ingredients, establishing such a degre of concentration of the caustic soda solution of the mixture as will render the soluble oxysalts of arsenic and tin in the mixture substantially insoluble on cooling the mixture, such that upon cooling substantially all of the oxysalts in the mixture will separate out in one operation, cooling the mixture to separate said oxysalts and separating said oxysalts from the caustic soda solution, dissolving these oxysalts and treating the resulting solution to convert the sodium into sodium carbonate whereby the tin forms an insoluble compound that may be separated from the solution, separating said tin compound from the solution and treating the remaining solution for the separation of the arsenic.

10. Method of recovering ingredients from an alkali aqueous mixture containing caustic soda in strong hot solution and also metal ingredients some in the form of soluble oxysalts and some undissolved, which comprises separating out the insoluble ingredients, establishing such a degree of concentration of the caustic soda solution of the mixture as will render the soluble oxysalts in the mixture substantially insoluble on cooling, such that upon cooling substantially all of these oxysalts will separate out in one operation, cooling the mixture to separate out said oxysalts and separating said oxysalts from the caustic soda solution, and treating the caustic alkali solution to recover the caustic soda.

11. Method of recovering ingredients from an alkali aqueous mixture containing caustic soda in strong hot solution and also metal ingredients some in the form of soluble oxysalts and some undissolved, which comprises separating out the insoluble ingredients, establishing such a degree of concentration of the caustic soda solution of the mixture as will render the soluble oxysalts in the mixture substantially insoluble on cooling, such that upon cooling substantially all of these oxysalts will separate out in one operation, cooling the mixture to separate out said oxysalts and separating said oxysalts from the caustic soda solution, treating said last solution to recover the caustic soda, dissolving said soluble oxysalts and subjecting the resulting solution to reactions which will precipitate the compounds of the metals of these oxysalts and will yield caustic soda, and recovering this caustic soda.

12. In connection with the method of recovering ingredients from an alkali aqueous mixture resulting from treating metal and containing caustic soda in strong hot solution and an alkali oxysalt of tin in solution, the step which comprises as a prerequisite for the separation of the tin from the solution, the proportioning of arsenic to the tin so that the ratio of tin to arsenic will be such that the amount of tin that will be separated from the solution by subsequent crystallization will be increased, and having obtained said solution with the desired ratio of arsenic to tin, causing the oxysalts of arsenic and tin to crystallize upon cooling the solution.

13. In connection with the method of recovering ingredients from an alkali aqueous mixture resulting from treating metal and containing caustic soda in strong hot solution and oxysalts of arsenic and tin in solution, the step which comprises as a prerequisite for the separation of the tin with the arsenic, the establishing of a preponderance of arsenic over tin in the proportion of at least 3 parts by weight of arsenic to one of tin, and having obtained said mixture hot containing this proportion of arsenic to tin, separating said oxysalts of arsenic and tin by cooling the mixture while at a proper degree of concentration.

14. Method of recovering ingredients from an alkali aqueous mixture containing caustic soda in strong hot solution and tin in dissolved state, the steps for separating the tin from association with the caustic soda which comprise proportioning arsenic to the tin in the mixture so that the ratio of tin to arsenic will be such that the amount of tin separable by crystallization is materially increased by the presence of said arsenic, then by establishing proper concentration of the mixture causing substantially all of the tin and arsenic to crystallize out in one operation in the form of their oxysalts and separating the same from the solution containing the caustic soda.

15. Method of recovering ingredients from an alkali aqueous mixture containing caustic soda in strong hot solution and tin in dissolved state, the steps for separating the tin from association with the caustic soda which comprise introducing arsenic into the mixture in such proportion that there are at least 3 parts by weight of arsenic to one part by weight of tin and then by having the mixture at a proper degree of concentration causing the tin to separate out together with the arsenic in the form of sodium oxysalts of tin and arsenic.

16. In a method of recovering ingredients from a solution containing sodium oxysalts of tin and arsenic in solution, the step which comprises separating the tin from the arsenic by converting the sodium of the oxysalt of tin into sodium carbonate whereby the tin forms an insoluble compound while the oxysalt of arsenic remains in solution, and separating the insoluble tin compound from the solution containing the arsenic.

17. In a method of recovering ingredients from a solution containing sodium oxysalts of tin and arsenic in solution, the step which comprises separating the tin from the arsenic by treating the solution with such a compound of an alkali earth metal as in the solution will precipitate an alkali earth compound of tin without precipitating substantially any alkali earth compound of arsenic, whereby the tin forms an insoluble compound while the arsenic remains in solution.

18. In a method of recovering ingredients from a solution containing sodium oxysalts of tin and arsenic in solution, the step which comprises separating the tin from the arsenic by treating the solution with such a compound of calcium as in the solution will precipitate a calcium oxysalt of tin without precipitating any substantial amount of a calcium oxysalt of arsenic.

19. In a method of recovering ingredients from a solution containing sodium oxysalts of tin and arsenic in solution, the step which comprises separating the tin from the arsenic by treating the solution with calcium carbonate such as commercial chalk to precipitate a calcium oxysalt of tin without precipitating any substantial amount of calcium oxysalt of arsenic.

20. In a method of recovering ingredients from an alkali aqueous mixture containing caustic soda in strong hot solution and sodium oxysalts of tin and arsenic in solution, the steps which comprise causing said oxysalts to crystallize and separating same from the mixture, dissolving the crystals, separating the tin and thereafter precipitating arsenic from the resulting solution by treating the solution with a suitable calcium compound.

21. Method of recovering ingredients from an alkali aqueous mixture containing caustic soda in strong hot solution and tin and arsenic oxysalts in solution, the steps which comprise establishing such a degree of concentration of the caustic soda solution of the mixture that when the mixture is cooled substantially all of the oxysalts of tin and arsenic will separate out in one operation, cooling the mixture to separate the said oxysalts, separating the oxysalts from the caustic soda solution, dissolving the oxysalt crystals and subjecting the resulting solution to reactions which will precipitate the tin and arsenic.

22. In a method of recovering ingredients from an alkali aqueous mixture containing caustic soda in strong hot solution and sodium oxysalts of tin and arsenic in solution, the steps which comprise causing said oxysalts to crystallize, separating these crystals from the solution, dissolving the crystals, separating the tin from the arsenic by converting the sodium of the oxysalt of tin into sodium carbonate, whereby the tin forms an insoluble compound while the oxysalt of arsenic remains in solution, separating the precipitate and treating the resulting solution with a suitable reagent which will precipitate the arsenic.

23. Method of recovering ingredients from an alkali aqueous mixture containing caustic soda in strong hot solution and oxysalts of arsenic and tin in solution, which comprises establishing such a degree of concentration of the caustic soda solution of the mixture as will render the oxysalt of arsenic in the mixture substantially insoluble on cooling the mixture, such that upon cooling substantially all of the oxysalt of arsenic will separate out in one operation, cooling the mixture to separate out said oxysalt, and separating the oxysalt from the caustic soda solution.

In testimony whereof I have signed my name to this specification.

HENRY HARRIS.